(12) United States Patent
Wachenheim et al.

(10) Patent No.: US 8,812,180 B2
(45) Date of Patent: Aug. 19, 2014

(54) METHOD AND DEVICE FOR AUTOMATICALLY MANAGING THE VERTICAL PROFILE OF THE FLIGHT PLAN OF AN AIRCRAFT

(75) Inventors: Maxime Wachenheim, Toulouse (FR);
Pierre Daste, Toulouse (FR);
Christophe Bouchet, Toulouse (FR);
Alexandre Lanoix, Fontenilles (FR);
Romain Merat, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 202 days.

(21) Appl. No.: 13/422,031

(22) Filed: Mar. 16, 2012

(65) Prior Publication Data
US 2012/0253562 A1    Oct. 4, 2012

(30) Foreign Application Priority Data
Mar. 29, 2011 (FR) .................................. 11 52603

(51) Int. Cl.
*G06G 7/78* (2006.01)
*G01C 23/00* (2006.01)
*G08G 5/00* (2006.01)
G01C 21/20 (2006.01)
G05D 1/02 (2006.01)

(52) U.S. Cl.
CPC .............. *G08G 5/0034* (2013.01); *G01C 21/20* (2013.01); *G08G 5/0039* (2013.01); *G01C 23/005* (2013.01); *G05D 1/0202* (2013.01)
USPC ....... 701/14; 701/3; 701/4; 701/120; 244/175

(58) Field of Classification Search
USPC ................. 701/3, 4, 5, 14, 18, 120, 121, 122; 244/175, 186
See application file for complete search history.

(56) References Cited

U.S. PATENT DOCUMENTS

| 4,792,906 | A | * | 12/1988 | King et al. ...................... 701/5 |
| 5,337,982 | A | * | 8/1994 | Sherry ............................ 701/18 |
| 6,134,500 | A | * | 10/2000 | Tang et al. ...................... 701/3 |
| 6,163,743 | A | * | 12/2000 | Bomans et al. ................ 701/14 |
| 6,389,355 | B1 | | 5/2002 | Gibbs et al. |
| 6,625,537 | B2 | * | 9/2003 | Dwyer ........................ 701/467 |
| 7,366,591 | B2 | * | 4/2008 | Hartmann et al. ............. 701/14 |
| 2003/0139877 | A1 | | 7/2003 | Dwyer |
| 2010/0250026 | A1 | | 9/2010 | Deker et al. |
| 2012/0059535 | A1 | * | 3/2012 | Jackson et al. .................. 701/3 |

FOREIGN PATENT DOCUMENTS

WO    0225214    3/2002

OTHER PUBLICATIONS

French Patent Office, Preliminary Search Report for FR 1152603, Nov. 22, 2011 (2 pgs.).

* cited by examiner

*Primary Examiner* — Tuan C. To
*Assistant Examiner* — Dale W Hilgendorf
(74) *Attorney, Agent, or Firm* — Wood, Herron & Evans, LLP

(57) ABSTRACT

The vertical profile management device includes a flight management system unit that selects a plurality of successive standard cruise sections, each comprising a level phase and a transition phase. The cruise sections are defined by a plurality of features, including waypoints corresponding to a section starting point and a section ending point, a transition type, a transition mode, a transition speed, a level altitude, and a level speed. The flight management system unit also joins together the successive cruise sections in order to form a vertical profile of a flight plan. The cruise sections are configured to be added, removed, or re-sequenced in the flight plan because each section ending point is configured to be the section starting point of a next cruise section in the series.

8 Claims, 3 Drawing Sheets

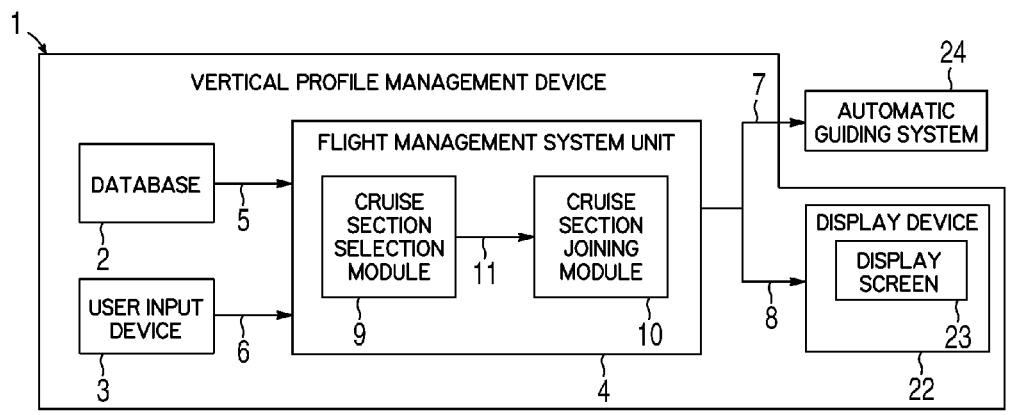
Fig. 1
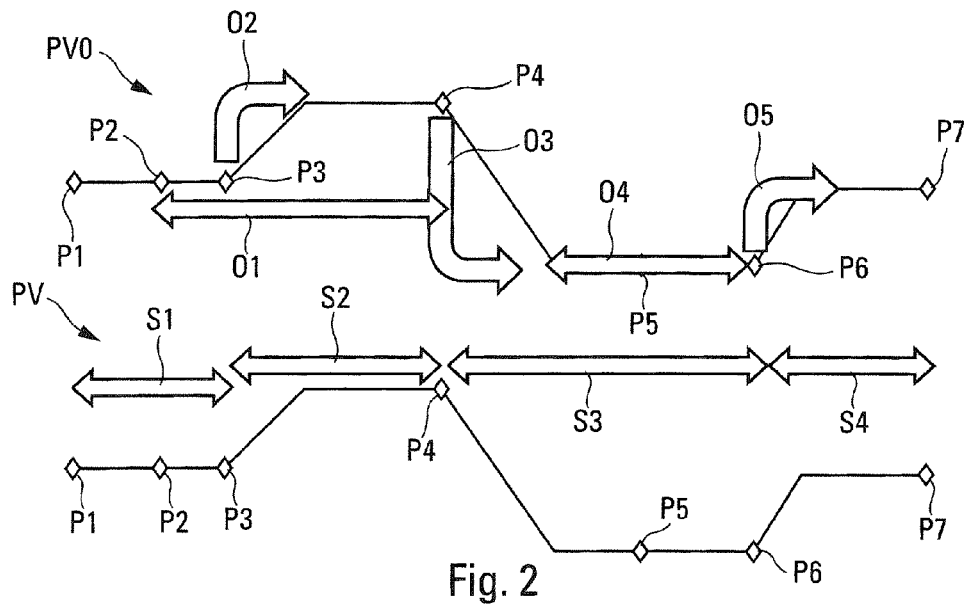
Fig. 2
| FROM/AT | | SPD | ALT |
|---|---|---|---|
| LFBO | CRZ | LONG RNG | FL 120 |
| LLFE | CRZ | LONG RNG | FL 160 |
| DIP | DROP | 144 KT | 13500 FT |
| EORP | CRZ | 250 KT | FL 160 |
| PYR14 | CRZ | MAX ENDUR | FL 200 |
| LFPO | | | |
Fig. 3

METHOD AND DEVICE FOR AUTOMATICALLY MANAGING THE VERTICAL PROFILE OF THE FLIGHT PLAN OF AN AIRCRAFT

TECHNICAL FIELD

The present invention relates to a method and a device for automatically managing the vertical profile of a flight plan of an aircraft, in particular a transport airplane.

BACKGROUND

It is known that a flight plan generally comprises waypoints to be flown over by the aircraft, information (altitude, speed, etc.) relating to such waypoints, as well as information concerning branches between the different waypoints. Such a flight plan allows a flight trajectory to be built comprising a lateral trajectory defined in the horizontal plane and a vertical trajectory (or vertical profile) defined in the vertical plane.

The present invention more particularly aims at the field of navigation and relates to a flight management functionality relating to a flight management system of the Flight Management System ("FMS") type. Such a system allows to plan, to manage, as well as to predict the flight, both in the horizontal plane and the vertical plane. More particularly, the present invention relates to the architecture of the elements intended for managing the vertical flight plane (vertical profile).

In order to aid piloting upon flights of civil and military aircrafts, different types of operations could be defined, each of said operations enabling to carry out one or more particular instructions. For instance, in the civil field, there is an operation allowing for a flight at constant Mach between two points (referred to as Constant MACH Segment ("CMS") from the expression CMS), and an operation concerning a change of altitude from a particular point (referred to as STEP FROM). In the military field, it is possible to carry out tactical operations such as a constant speed flight between two points, a flight at constant altitude and speed between two points, a change of altitude toward a particular point (referred to as STEP TO), as well as other specific military operations such as a drop (DROP) or an air to air refuelling in flight (Air to Air Refueling ("AAR").

Each of such operations is independently managed by the flight management system and has specific and different properties and rules.

Thus, the issue associated with the definition of the vertical profile results from:
 the multiplicity of possible maneuvers, due to various military or civil operations, involving the definition of specific rules for managing each one of them;
 the combinatorics resulting from sequences and superpositions of these different operations; and
 the impossibility to manage the transitions between two successive levels, reducing the possibilities of military applications.

In addition, different operations could sometimes at least be partially superimposed (for instance a constant speed segment could be superimposed, in part, to a climbing phase), increasing the complexity of the situation and making difficult the definition of a system being robust in every situation able to be met.

Because of the sequence of multiple elements of the flight plan, for military and civil operations, a combinatorics problem thus occurs. Indeed, each element of the flight plan has its own complexity, its own implementation (specific and dedicated algorithms), making it a single entity. For example, a change of level depends on two parameters being the starting waypoint of the change of level and the altitude of the level to be reached. Conversely, a constant Mach segment depends on two (starting and ending) waypoints, as well as the Mach instruction between these waypoints. As a result, the succession of these different phases becomes more complex as long as an evolution occurs at the level of these operations. If new types of operations are added or some characteristics of these operations are modified, the whole sequence of phases should be reviewed.

For example, during the sequence of an air refuelling in flight and of a drop, for instance, it becomes complex to define an adequate transition, each element having its own features and transitions.

Besides the complexity added by the military phases, the issue is also linked to the impossibility to manage the transition phases. These transition phases are necessary in military operations and more particularly in the sequence of the latter. For instance, upon a drop, it is sometimes necessary to check the climbing/descent slope toward the dropping altitude so as not to disturb the preparation of the drop (for preventing items to be dropped from sliding or paratroopers from loosing their balance).

Furthermore, the elements of the flight plan existing in the civil field do not allow to manage the transitions between levels. Thus, generalizing civil modes to the military field would result in an additional complexity because of the additional phases to be managed. Indeed, the impossibility to manage the transitions is not adapted to the military field requiring particular transitions for implementing the different flight phases. Such an evolution considerably complicates implementing the elements of the flight plan and sequencing these elements both for the pilot and for the system that should manage the flight plan (also involving an increased complexity in the development of the FMS system with a multiplicity of algorithms). Consequently, the solutions existing in the civil field are not adapted to military applications and do not allow to satisfactorily manage the two types of flight plan at the same time.

Furthermore, it is known:
 from document US-2003/0139877, a method and a device for assembling a flight plan;
 from document U.S. Pat. No. 6,389,355, a method and a device for displaying and editing a flight plan;
 from document US-2010/0250026, an interactive navigation device, comprising at least one navigation display able to display a representation of the flight plan; and
 from document WO-02/25214, a graphic system and a method for defining requests from pilots.

The present invention relates to a method for automatically managing the vertical profile of a flight plan of an aircraft, in particular a transport airplane, comprising waypoints to be flown over by said aircraft, allowing the above mentioned drawbacks to be overcome.

SUMMARY OF THE INVENTION

To this end, according to this invention, said method is remarkable:
 a) means are provided allowing an operator to enter managing parameters;
 b) a plurality of successive standard flight sections is automatically determined from these managing parameters, each flight section:
  corresponding to one of a plurality of predetermined types of flight sections (each of which is governed by a set of predetermined unique rules) and being defined between a section starting point and a section ending point; and comprising both a transition phase allowing to reach a level and having particular features and said level also having particular features, said managing parameters allowing to define at least some of said features;

c) said thus determined successive flight sections are joined together so as to form automatically the vertical profile of the flight plan, the ending point of any flight section corresponding if applicable to the starting point of the flight section directly following it. The vertical profile of the flight plan is automatically updated so as to meet the compatibility of the flight sections; and d) the thus formed vertical profile of the flight plan is supplied to user means (displaying means, guiding means, etc.).

Thus, thanks to the invention, a new element is taken into consideration in the definition of the flight plan, that is the flight section ("cruise section"). This cruise section involves a generic element enabling, as a result of its properties, to model any flight element (or part) either civil or military, as well as the associated transitions. The flight plan thus comprises a sequence of cruise sections, each exhibiting different properties.

A harmonization and a simplification of the flight plan are thereby achieved. As specified below, such a simplification also applies to any new evolution of the flight plan, such as the addition of a new tactical function for instance.

Taking into consideration, according to this invention, these cruise sections allow, more specifically, to overcome the three above mentioned problems. More precisely:

providing a model of generic cruise section, having its operation governed by a set of unique rules enables to remove the need to establish different rules for each one of the contemplated specific operations. This results in a significant reduction of the complexity in terms of embodiment, software development, validation etc.;

as the cruise section is a single element, the combinatorics of the sequence of cruise sections is considerably reduced, compared to the usual solutions that should be robust for any sequence. Similarly, as opposed to the prior art for which operations could superimpose each other (with the induced complexity of having to define a solution being robust in all the possible cases), the flight sections are successively sequenced, without superimposing each other, the ending point of any flight section corresponding to the starting point of the flight section directly following it; and transitions are always (directly and completely) managed, as they are intrinsic to the definition of the flight section. Thus upon the creation of a flight section, it is known how the transition between two successive sections will occur, from the features of said transition.

Consequently, a usual complex flight plan, comprising multiple instructions even able to overlap each other, becomes, thanks to the flight sections according to this invention, a simple flight plan with flight sections exhibiting standard properties. Thereby, the multiplicity of usual operations is replaced by successive elements having well defined properties. Their succession becomes simpler and superpositions are removed, making a flight plan complex.

A cruise section could have at least one of the following types:
 a climbing section;
 a descent section;
 a constant speed section; and
 a constant altitude section.

A flight is thus a generic element of the flight plan, comprising a transition followed by a level. Each level and each associated transition have their own properties. In particular, each cruise section is advantageously defined using at least the following features:
 a waypoint corresponding to the section starting point;
 a waypoint corresponding to the section ending point;
 the transition type;
 the transition mode;
 the transition speed;
 the level altitude; and
 the level speed.

The contemplated transition type could correspond to one of the following types:
 climbing to a given point;
 descending to a given point;
 climbing from a given point;
 descending from a given point; and
 maintaining a constant altitude.

In addition, advantageously, at least one cruise section of the vertical profile is further defined, using a time constraint at the section starting point. In such a case, the speed of the aircraft is adapted for fulfilling such a time constraint at said section starting point.

Furthermore, advantageously, for reviewing the vertical profile of a flight plan, at least one of the following operations could be carried out:
 a new cruise section is inserted into the flight plan;
 a cruise section of said flight plan is modified, modifying at least some of its features; and
 a cruise section is removed from said flight plan.

Cruise sections being fully mutually compatible entities, able to be joined together so as to form the flight plan, the whole flight plan according to this invention is harmonized, and it therefore becomes easy to modify it thru inserting, modifying and/or removing cruise sections.

The present invention thus allows the achievement, in addition to the simplification of the flight plan, of a significant flexibility and an easy evolution. Indeed, thanks to the invention, subsequently other types of functions could be easily inserted, such as useful military functions or civil applications. To this end, just defining the new function is sufficient through properties of one or more cruise sections, so as to create one or more consecutive corresponding cruise sections with their own features, to be inserted into the flight plan.

Furthermore, advantageously, at step d), on a display screen of the cockpit of the aircraft, said vertical profile of the flight plan is displayed, as well as at least all the features of said vertical profile able to be modified by an operator, and means are provided, allowing the operator to modify these features, to be taken into consideration for reviewing said vertical profile. This will facilitate a review of the flight plan. Said vertical profile of the flight plan could also be transmitted to other user means, such as an automatic guiding system of the aircraft for instance.

The present invention also relates to a device for automatically managing the vertical profile of a flight plan of an aircraft, comprising waypoints to be flow over by the aircraft.

According to this invention, said device is remarkable it comprises:
 first means allowing an operator to enter managing parameters;
 second means for determining automatically a plurality of successive standard cruise sections from these managing parameters, each cruise section:

corresponding to one of a plurality of predetermined types of cruise sections and being defined between a section starting point and a section ending point; and comprising both a transition phase allowing to reach a level and having particular features and said level also having particular features, said managing parameters allowing to define at least some of said features;

third means for joining together automatically said successive cruise sections so as to form the vertical profile of the flight plan, the ending point of any cruise section corresponding if applicable to the starting point of the cruise section directly following it; and fourth means for supplying the thus formed vertical profile of the flight plan to user means.

Advantageously, said device further comprises means for displaying on a display screen said vertical profile of the flight plan, as well as at least all the features of said vertical profile able to be modified by an operator.

In a particular embodiment, said device further comprises means allowing an operator to carry out at least one of the following operations, with the aim to review the vertical profile of a flight plan:

inserting a new cruise section into the flight plan;

modifying a flight section of said flight plan, modifying at least some of its features;

removing a cruise section from said flight plan.

The present invention also relates to:

a civil or military aircraft, in particular a transport airplane, being provided with a device such as above mentioned; and/or an aircraft system, for instance an automatic guiding system, comprising such a device.

BRIEF DESCRIPTION OF THE DRAWINGS

The FIGS. of the appended drawings will better explain how this invention can be implemented. In these FIGS., like reference numerals relate to like components.

FIG. 1 is the block diagram of a device according to the invention, for managing the vertical profile of a flight plan of an aircraft.

FIG. 2 shows two superimposed diagrams respectively illustrating a usual flight plan and a flight plan according to this invention.

FIG. 3 schematically illustrates a display of the vertical profile of a flight plan according to this invention.

DETAILED DESCRIPTION

Figure 4:
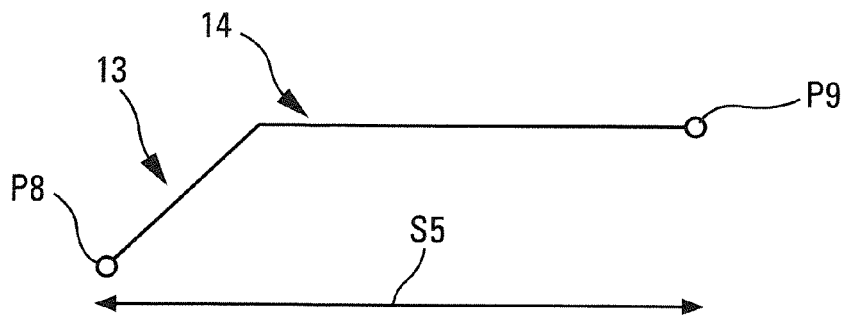
FIG. 4 schematically illustrates a first type of transition, specifically a FROM transition.

The vertical profile management device 1 according to this invention and schematically shown on FIG. 1, is intended for managing at least the vertical profile of a flight plan of a military or civil aircraft AC, in particular a transport airplane.

A flight plan generally comprises at least:

"waypoints" P1 to P7 (FIG. 2), that are predefined geographical navigation points, to be flown over by the aircraft AC and being stored in a navigation data base or explicitly defined by an operator, in particular a pilot of the aircraft AC; and information (altitude, speed, etc.) relating to these waypoints.

Such a flight plan allows a flight trajectory to be built, comprising:

a lateral trajectory defined in the horizontal plane and comprising rectilinear branches meeting at said waypoints; and a vertical trajectory (or vertical profile) defined in the vertical plane.

More particularly for managing the vertical profile of a flight plan, the vertical profile management device 1 being embedded on the aircraft AC, in particular a military transport airplane, usually comprises (as shown in FIG. 1):

a set of information sources such as a database 2 comprising the waypoints, being able to supply (and optionally to usually determine) the lateral trajectory of said flight plan, as well as parameters relating to the flight of the aircraft AC;

a user input device 3, for instance a computer keyboard and/or mouse associated with a display, allowing an operator to enter in the vertical profile management device 1 managing parameters, to be set forth below;

a flight management system unit 4, being connected via links 5 and 6 respectively to the database 2 and to the user input device 3 and being, for instance, part of a flight management system of the FMS type. Such a flight management system plans, manages, and predicts the flight, both in the horizontal plane and the vertical plane. Said flight management system unit 4 determines more specifically, the vertical profile of the flight plan PV, in particular using information received from said database 2 and from said user input device 3; and links 7, 8 that transmit at least this vertical profile and preferably the whole flight plan to user devices, to be set forth below.

According to this invention, the flight management system unit 4 comprises:

means for automatically determining a plurality of successive standard cruise sections from these managing parameters (hereinafter referred to as a cruise section selection module 9). Within the context of the present invention, each cruise section:

corresponds to one of a plurality of predetermined types of cruise sections (each being governed by a set of predetermined unique rules)

is defined between a section starting point and a section ending point; and includes both a transition phase allowing to reach a level and having particular features and said level to be reached also having particular features, said managing parameters allowing to define at least some of said features;

means being connected via a link 11 to said cruise section selection module 9 and being formed so as to join together automatically said thus determined successive cruise sections so as to form the vertical profile of the flight plan (hereinafter referred to as cruise section joining module 10), the ending point of any cruise section corresponding to the starting point of the cruise section directly following it, should this be the case.

Thus, the vertical profile management device 1 according to the invention takes into consideration a new element in the definition of the flight plan, that is the cruise section. This cruise section involves a generic element allowing, as a result of its properties, to model any flight element (or part) either civil or military as well as the associated transitions. The flight plan thus comprises a succession of cruise sections, each exhibiting different properties.

A harmonization and a simplification of the flight plan are thereby achieved. As specified below, such simplification also applies to any new evolution of the flight plan, such as the addition of a new military operation for instance.

Taking into consideration according to this invention these flight sections also has the following advantages:
- providing a model of generic cruise section, having its operation governed by a set of unique rules enables to remove the need to establish different rules for each one of the contemplated specific operations. This results in a significant reduction of the complexity in terms of embodiment, software development, validation, etc.;
- as the cruise section is a unique element, the combinatorics of the sequence of cruise sections is considerably reduced, compared to the usual solutions that should be robust for any sequence. Similarly, as opposed to the prior art for which operations could be superimposed (with the induced complexity of having to define a solution being robust in every possible case), the cruise sections are successively imbricated with no mutual superimposition. The ending point of any cruise section corresponds if applicable to the starting point of the cruise section directly following it; and
- transitions are always (directly and completely) managed, as they are intrinsic to the definition of the cruise section. Thus, upon the creation of a cruise section, it is known how the transition between two successive sections will occur, from the transition features.

FIG. 2 shows the vertical profile of a usual complex flight plan PV0, comprising, more specifically, a drop phase and consisting in multiple operations O1 to O5 able to be superimposed, as is the case for O1 and O2. More precisely:
- O1 represents a constant speed segment;
- O2 represents a climb, for instance, at a cruise altitude;
- O3 represents a descent at the drop altitude;
- O4 represents the drop phase; and
- O5 represents a climb.

Thanks to the cruise sections according to this invention, this usual complex flight plan PV0 becomes a simple flight plan PV with standard property cruise sections S1 to S4. The flight plans PV0 and PV correspond to an identical mission. Thus, the multiplicity of operations O1 to O5 is replaced by successive elements S1 to S4 having well defined properties. Their sequence becomes simpler and superpositions are prevented, as they make a flight plan complex.

A cruise section is thus a generic element of the flight plan, comprising a transition and a level. Each level and each associated transition have their own properties as set forth hereinafter.

| Properties of the cruise sections | |
| --- | --- |
| Section type/Section name | Type of the section to be flown over: this could be a drop, an air refuelling, or a cruise section of the civil type |
| Starting waypoint | Waypoint, on which the transition is anchored |
| Ending waypoint | Starting waypoint of the following cruise section (on which the transition of the following cruise section is anchored) |
| Altitude of the level | Altitude at which the level of the section should be flown |
| Level speed | Speed at which the level of the section should be flown |
| Time constraints | Allows to define a time constraint at the starting waypoint |

| Properties of the transitions | |
| --- | --- |
| Type | The type corresponds to two main ways how to fly the transition: initiation of the climb/descent from/to the starting waypoint. There is also a particular case for which the altitude between two successive sections is constant, as set forth below |
| Mode | The mode corresponds to the way the transition is carried out. For instance, the aircraft could carry out the transition at a fixed thrust speed, or with a slope or a predefined vertical speed |
| Transition speed | Speed at which the transition should be flown |

The cruise sections being generic, they could have the form of any flight element. A cruise section could more specifically represent:
- a constant speed or Mach constant segment;
- a low speed flight segment;
- a drop;
- an air refuelling; and
- a rescue mission.

These functionalities are known to the pilot, as the pilot will introduce the segment with a particular purpose, but they are not necessary to the FMS system that should organize its flight plan in the same way for all the functions. From the standpoint of cruise sections, the FMS system considers a drop and a constant speed segment in an equivalent way, but only defined by different properties. Thus:
- the starting waypoint is the anchoring waypoint of the section. It depends on the associated transition type;
- the ending waypoint is the starting waypoint of the following section;
- the altitude of the section corresponds to the altitude reached after the transition. The latter could be defined in feet or in flight level;
- the level speed corresponds to the target speed for flying the level. It could be different from that of the transition. It could be defined in knots or in Mach, or even in flight optimization criterion (economical speed mode, for instance, cost index type or another optimization parameter of the maximum endurance type, maximum speed, etc.); and the time constraint allows to define a constraint on the time of arrival at the start of the section. If a time constraint is defined, the speed of the aircraft will be adapted so as to respect the time constraint.

Figure 5:
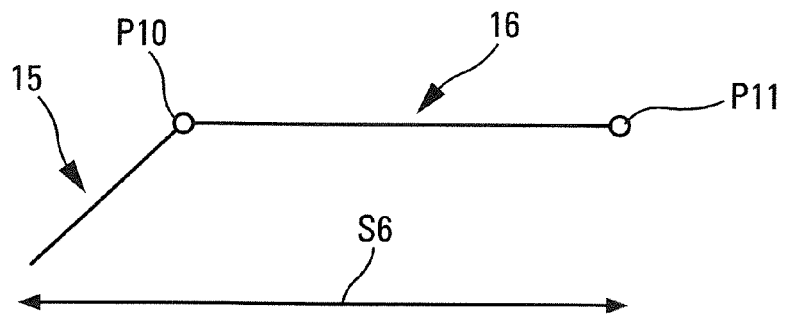
FIG. 5 schematically illustrates a second type of transition, specifically a TO transition.

Besides, the transition type corresponds to the transition geometry. There are several transition schemes, to be set forth hereinafter, as a function of the contemplated maneuver. Thus:

a transition of the "FROM" type is a transition being structured as shown on FIG. 4. In this scheme, the starting point P8 is specified so that the transition should be initiated right at that point. The transition 13 is then carried out so as to meet the level 14 from the starting point P8. The exact point from which the aircraft flies at the right level altitude, as well as the other right section parameters, is not controlled by the pilot. Only the starting point P8 of the transition and the ending point P9 of the section S5 are defined;

a transition of the "TO" type is a transition being structured as shown on FIG. 5. In this transition scheme (the effective transition of which is referred to as 15), the starting point P10 of the level 16 is specified by the operator. The device 1 calculates the trajectory so as to reach the required parameters (altitude, speed, etc.) exactly in this point P10. Only this point P10 and the ending point P11 of the section S6 are imposed; and the particular (not shown) case where the altitude between two successive sections remains constant. In such a case, the section change corresponds to the modification of another parameter such as speed for instance.

In addition:

the mode of the transition of a cruise section corresponds to the engine speed and vertical control association to be used during the transition. The aircraft could be requested, for instance, to maintain a constant speed as well as a constant engine speed, or even a constant angle slope associated with a constant or variable speed being managed by the engines; and the transition speed is the speed during the transition, defined in knots or in Mach.

When all the above mentioned parameters (or features) are defined, the cruise section is completely defined.

Figure 6:
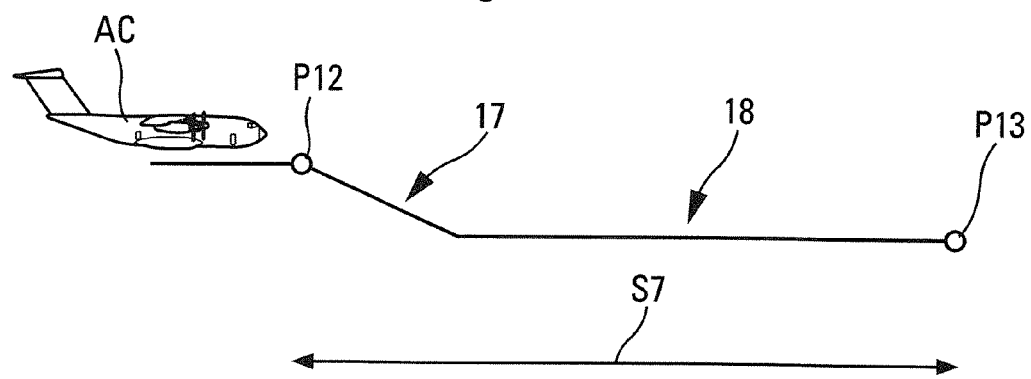
FIG. 6 is a schematic illustration of a first type of cruise section, such as used in civil flight plans.

An example of overview of the flight plan showing the conversion of such parameters into an element of a civil flight plan and its practical implementation is shown on FIG. 6. The cruise section S7 defined by the review extends from P12 to P13. It comprises a transition 17 allowing to reach the level altitude 18, and at the desired speed thanks to an intermediary speed. The starting altitude and speed (before the section) are typical of the previous section and do not belong to the properties of the current section S7.

Figure 7:
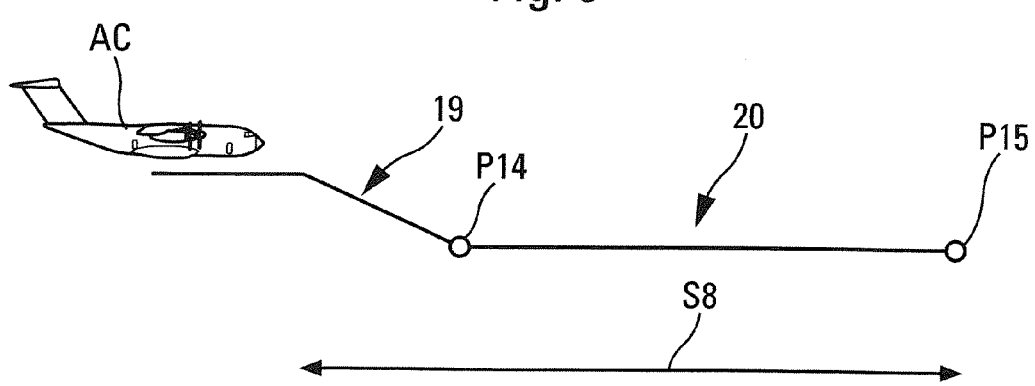
FIG. 7 is a schematic illustration of a second type of cruise section, such as used in military flight plans.

In addition, the cruise section S8 shown on FIG. 7 is a cruise section for a military application, with a drop phase 20 between the points P14 and P15 (with a descent 19). It is defined exactly the same as in the case of a civil section. It is also flown over the same way. This allows to easily add such a section, before or after another section.

The vertical profile of a flight plan therefore comprises a plurality of such successive, joined together, cruise sections.

Figure 8:
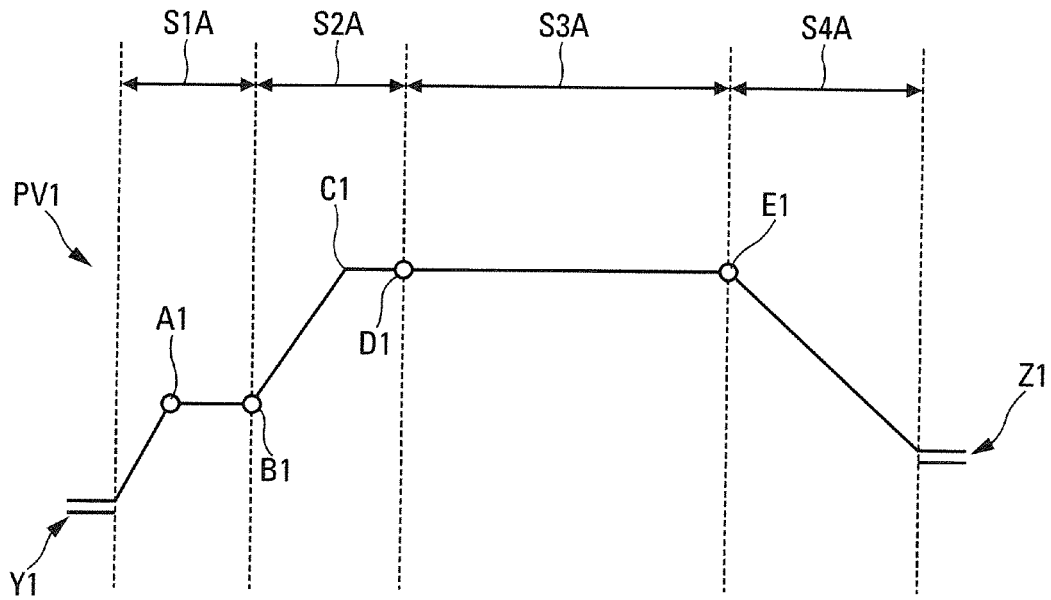
FIG. 8 illustrates a flight plan according to this invention, specifically in the civil field.

By way of illustration, FIG. 8 shows a flight plan PV1 being typical of a civil application. This flight plan PV1 comprises:

a climb (up to A1) from the start Y1, in order to reach a cruise altitude (level between A1 and B1)

an altitude review modifying the cruise altitude, leading to a new level (transition between B1 and C1, level between C1 and D1);

a speed review so as to obtain a constant speed or Mach segment (constant speed between D1 and E1); and a descent allowing to reach the destination (descent after E1 down to the destination Z1).

Each one of these steps is a cruise section with its own features presented in the following table:

| Properties of section S1A | |
|---|---|
| Type/Name | Climb |
| Starting waypoint | A1 |
| Ending waypoint | B1 |
| Level altitude | 5,000 feet (FT) |
| Level speed | 250 knots (KT) |
| Properties of the transition associated with section S1A | |
| STEP TO/FROM | TO |
| Mode | Constant angle |
| Transition speed | 200 knots |
| Properties of section S2A | |
| Type/Name | Constant altitude section |
| Starting waypoint | B1 |
| Ending waypoint | D1 |
| Level altitude | FL300 |
| Level speed | 250 knots |
| Properties of the transition associated with section S2A | |
| STEP FROM/TO | FROM |
| Mode | Constant thrust, constant speed |
| Transition speed | 250 knots |
| Properties of section S3A | |
| Type/Name | Constant speed section |
| Starting waypoint | D1 |
| Ending waypoint | E1 |
| Level altitude | FL300 |
| Level speed | Mach 0.7 |
| Properties of the transition associated with section S3A | |
| STEP TO/FROM | Level to a waypoint |
| Mode | Constant thrust, constant speed |
| Transition speed | 260 knots |
| Properties of section S4A | |
| Type/Name | Descent |
| Starting waypoint | E1 |
| Ending waypoint | Arrival Z1 |
| Level altitude | FL300 |
| Level speed | 200 knots |
| Properties of the transition associated with section S4A | |
| STEP TO/FROM | TO |
| MODE | Constant angle |
| Transition speed | 220 knots |

In the case of a military flight plan, other types of sections could be involved, being associated with military functions. Such sections are processed the same way as civil sections except that their goal is different.

Figure 9:
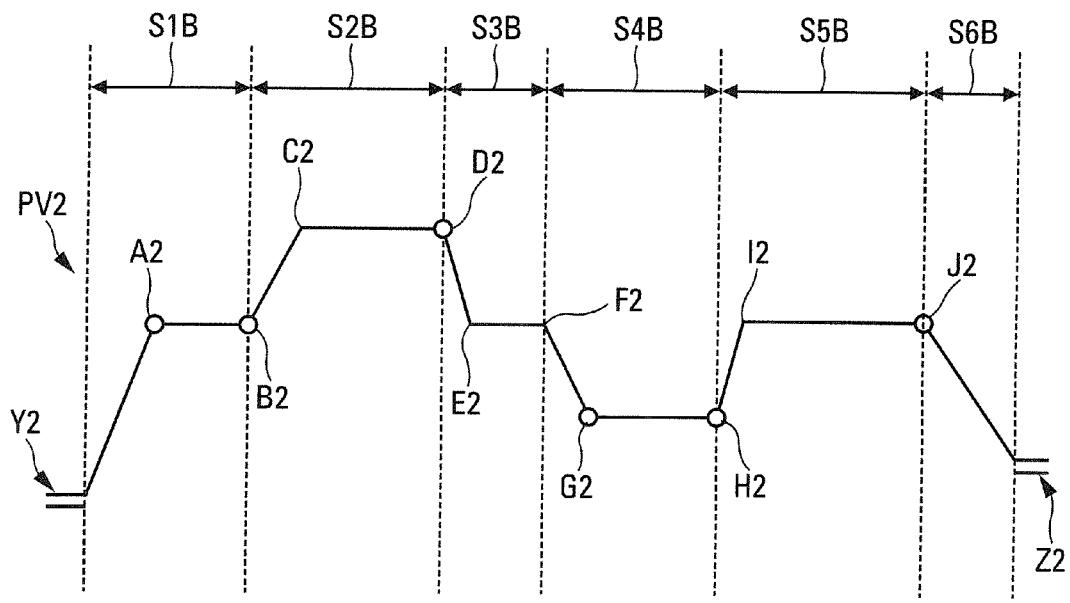
FIG. 9 illustrates a second flight plan according to this invention, specifically in the military field.

By way of illustration, FIG. 9 shows a flight plan PV2 being typical of a military application with a drop and an air refuelling during the flight. This flight plan PV2 comprises:

first of all, a climbing phase (from the start Y2 to A2) for reaching the cruise altitude (between A2 and B2);

an air refuelling at a higher altitude (transition between B2 and C2, then air refuelling between C2 and D2);

an intercalation section so as to come back to a cruise altitude before the drop (coming back to the cruise altitude in E2);

a drop section (transition so as to be at the drop altitude in G2, then drop up to H2);

an intercalation section so as to come back to the cruise altitude (coming back to the cruise altitude in I2); and a descent (from J2) for reaching the destination Z2.

As can be seen, the military sections are inserted between two civil sections quite easily thanks to the generic character of the sections. There is no transition or sequencing problem between the elements.

Each one of these steps is a cruise section with its own features presented in the following table:

| Properties of section S1B | |
|---|---|
| Type/Name | Climb |
| Starting waypoint | A2 |
| Ending waypoint | B2 |
| Level altitude | FL200 |
| Level speed | 250 knots |
| Properties of the transition associated with section S1B | |
| STEP TO/FROM | TO |
| Mode | Constant angle |
| Transition speed | 200 knots |

| Properties of section S2B | |
|---|---|
| Type/Name | Air refuelling |
| Starting waypoint | B2 |
| Ending waypoint | D2 |
| Level altitude | FL250 |
| Level speed | 200 knots |
| Properties of the transition associated with section S2B | |
| STEP TO/FROM | FROM |
| Mode | Constant thrust |
| Transition speed | 220 knots |

| Properties of section S3B | |
|---|---|
| Type/Name | Level change |
| Starting waypoint | D2 |
| Ending waypoint | F2 |
| Level altitude | FL200 |
| Level speed | 180 knots |
| Properties of the transition associated with section S3B | |
| STEP TO/FROM | FROM |
| Mode | Constant angle |
| Transition speed | 200 knots |

| Properties of section S4B | |
|---|---|
| Type/Name | Drop |
| Starting waypoint | G2 |
| Ending waypoint | H2 |
| Level altitude | 5,000 feet |
| Level speed | 130 knots |
| Properties of the transition associated with section S4B | |
| STEP TO/FROM | TO |
| Mode | Constant angle |
| Transition speed | 180 knots |

| Properties of section S5B | |
|---|---|
| Type/Name | Altitude change |
| Starting waypoint | H2 |
| Ending waypoint | J2 |
| Level altitude | FL200 |
| Level speed | 250 knots |
| Properties of the transition associated with section S5B | |
| STEP TO/FROM | FROM |
| Mode | Constant thrust |
| Transition speed | 200 knots |

| Properties of section S6B | |
|---|---|
| Type/Name | Descent |
| Starting waypoint | J2 |
| Ending waypoint | Arrival Z2 |
| Level altitude | FL200 |
| Level speed | 180 knots |
| Properties of the transition associated with section S6B | |
| STEP TO/FROM | TO |
| Mode | Constant angle |
| Transition speed | 190 knots |

In addition, the vertical profile management device 1 further comprises a display device 22 for displaying on a display screen 23 said vertical profile of the flight plan, as well as at least all the features of said vertical profile able to be modified by an operator, being received from the central flight management system unit 4 via the link 8. The display is achieved, preferably, by a mission management page such a shown, as an example, on FIG. 3. The vertical profile management device 1 also comprises means, preferably the the user input device 3, allowing the operator, including a pilot, to modify such features being taken into consideration for reviewing said vertical profile. For carrying out a review, a section could also be inserted by the page on which the waypoints of the flight plan are listed.

Flight sections being fully mutually compatible entities of the flight plan, able to be joined together so as to form the flight plan, the whole flight plan is harmonized, and it therefore becomes easy to modify it inserting, modifying and/or removing cruise sections.

Organizing and managing such cruise sections preferably occurs thru an interface corresponding to said mission management page. This page is a page allowing the pilot to have, at first glance, the whole recapitulation of the important elements of the pilot's flight with all the different, civil and military sections. In addition to representing the whole flight, this page allows to modify each cruise section. It, more specifically, enables to modify the parameters of the transitions or of the sections, such as speeds, altitudes, etc.

Each section has a button directly allowing its modification made available. The pilot can thereby manage the whole flight, including the military phases, from a single page. The page also allows the pilot to check the consistency of the flight plan.

The example shown on FIG. 3 comprises five drop sections, including a drop at 13,500 feet and a level at the flight level 200 from the point PYR14. The waypoints are LFBO, LLFE, DIP, EORP, PYR14 and LFPO, and for each cruise section, the display indicates speed ("SPD") and altitude ("ALT").

The vertical profile management device 1 could also supply said vertical profile of the flight plan to user systems of the aircraft (via the link 7), and in particular to a usual automatic guiding system 24, which guides the aircraft along the received flight plan.

The invention claimed is:

1. A method for automatically generating and managing a vertical profile of a flight plan of an aircraft, the flight plan comprising waypoints to be flown over by the aircraft, the method comprising:
   (a) receiving managing parameters provided by an operator, at a user input device, or provided by a database;
   (b) selecting, by a flight management system unit, a plurality of successive standard cruise sections based on the managing parameters, each cruise section corresponding to one of a plurality of predetermined cruise sections available to the flight management system unit, wherein each cruise section is defined by a waypoint corresponding to a section starting point and a waypoint corresponding to a section ending point, and each cruise section comprises:
      a transition phase allowing to reach a level and defined by a transition type, a transition mode, and a transition speed, and
      a level phase defining the level and defined by a level altitude and a level speed;
   (c) joining, by the flight management system unit, the plurality of successive flight sections together to form automatically the vertical profile of the flight plan, wherein the cruise sections are able to be inserted, removed, and sequenced in the flight plan in any order such that the ending point of any cruise section that precedes another cruise section corresponds to the starting point of the cruise section directly following it;
   (d) supplying, via links connected to the flight management system unit, the vertical profile of the flight plan to user means including a display screen.

2. The method according to claim 1, wherein the transition type for each of the cruise sections corresponds to one of the following types:
   climbing toward a given point;
   descending to a given point;
   climbing from a given point;
   descending from a given point; and
   maintaining a constant altitude.

3. The method according to claim 1, further comprising:
   defining at least one of the cruise sections using a time constraint at the section starting point, and
   controlling a speed of the aircraft so as to fulfill the time constraint at the section starting point.

4. The method according to claim 1, wherein each of the cruise sections is one of the following types:
   a climbing section;
   a descent section;
   a constant speed section; and
   a constant altitude section.

5. The method according to claim 1, wherein at step (d) further comprises:
   displaying on the display screen, the vertical profile of the flight plan, as well as features of the vertical profile that are able to be modified by an operator, and
   receiving modifications, at the flight management system unit, of the features of the vertical profile from the operator, to be taken into consideration for reviewing the vertical profile, the modifications including at least one of the following operations:
      a new cruise section is inserted into the flight plan;
      a cruise section of the flight plan is modified by modifying at least some features defined by the cruise section; or
      a cruise section is removed from the flight plan.

6. A vertical profile management device for automatically generating and managing a vertical profile of a flight plan of an aircraft, the flight plan comprising waypoints to be flown over by the aircraft, the device comprising:
   a user input device that allows an operator to enter managing parameters;
   a flight management system unit that selects automatically a plurality of successive standard cruise sections based on the managing parameters, each cruise section: corresponding to one of a plurality of predetermined cruise sections available to the flight management system unit, wherein each cruise section is defined by a waypoint corresponding to a section starting point and a waypoint corresponding to a section ending point; and each cruise section comprises:
      a transition phase allowing to reach a level and defined by a transition type, a transition mode, and a transition speed, and
      a level phase defining the level and defined by a level altitude and a level speed;
   wherein the flight management system unit joins together automatically said successive cruise sections to form the vertical profile of the flight plan, wherein the cruise sections are able to be inserted, removed, and sequenced in the flight plan in any order such that the ending point of any cruise section that precedes another cruise section corresponds to the starting point of the cruise section directly following it; and
   user devices including a display screen that receives the vertical profile of the flight plan from the flight management system unit via links.

7. The vertical profile management device according to claim 6, wherein the user devices further comprise a display device for displaying on the display screen said vertical profile of the flight plan, as well as features of said vertical profile able to be modified by an operator,
   wherein the flight management system unit receives modifications of the features of the vertical profile from the operator that are to be taken into consideration for reviewing the vertical profile, the modifications including at least one of the following operations:
      a new cruise section is inserted into the flight plan;
      a cruise section of the flight plan is modified by modifying at least some features defined by the cruise section; or
      a cruise section is removed from the flight plan.

8. An aircraft, comprising:
   a vertical profile management device for automatically generating and managing a vertical profile of a flight plan of an aircraft, the flight plan comprising waypoints to be flown over by the aircraft, the device comprising:

a user input device that allows an operator to enter managing parameters;

a flight management system unit that selects automatically a plurality of successive standard cruise sections based on the managing parameters, each cruise section: corresponding to one of a plurality of predetermined cruise sections available to the flight management system unit, wherein each cruise section is defined by a waypoint corresponding to a section starting point and a waypoint corresponding to a section ending point; and each cruise section comprises:

a transition phase allowing to reach a level and defined by a transition type, a transition mode, and a transition speed, and a level phase defining the level and defined by a level altitude and a level speed, wherein the flight management system unit joins together automatically said successive cruise sections to form the vertical profile of the flight plan, wherein the cruise sections are able to be inserted, removed, and sequenced in the flight plan in any order such that the ending point of any cruise section that precedes another cruise section corresponds to the starting point of the cruise section directly following it; and user devices including a display screen that receives the vertical profile of the flight plan from the flight management system unit via links; and an automatic guiding system that receives the vertical profile of the flight plan from the flight management system unit via links and then guides the aircraft using the vertical profile.

\* \* \* \* \*